Figure 1:
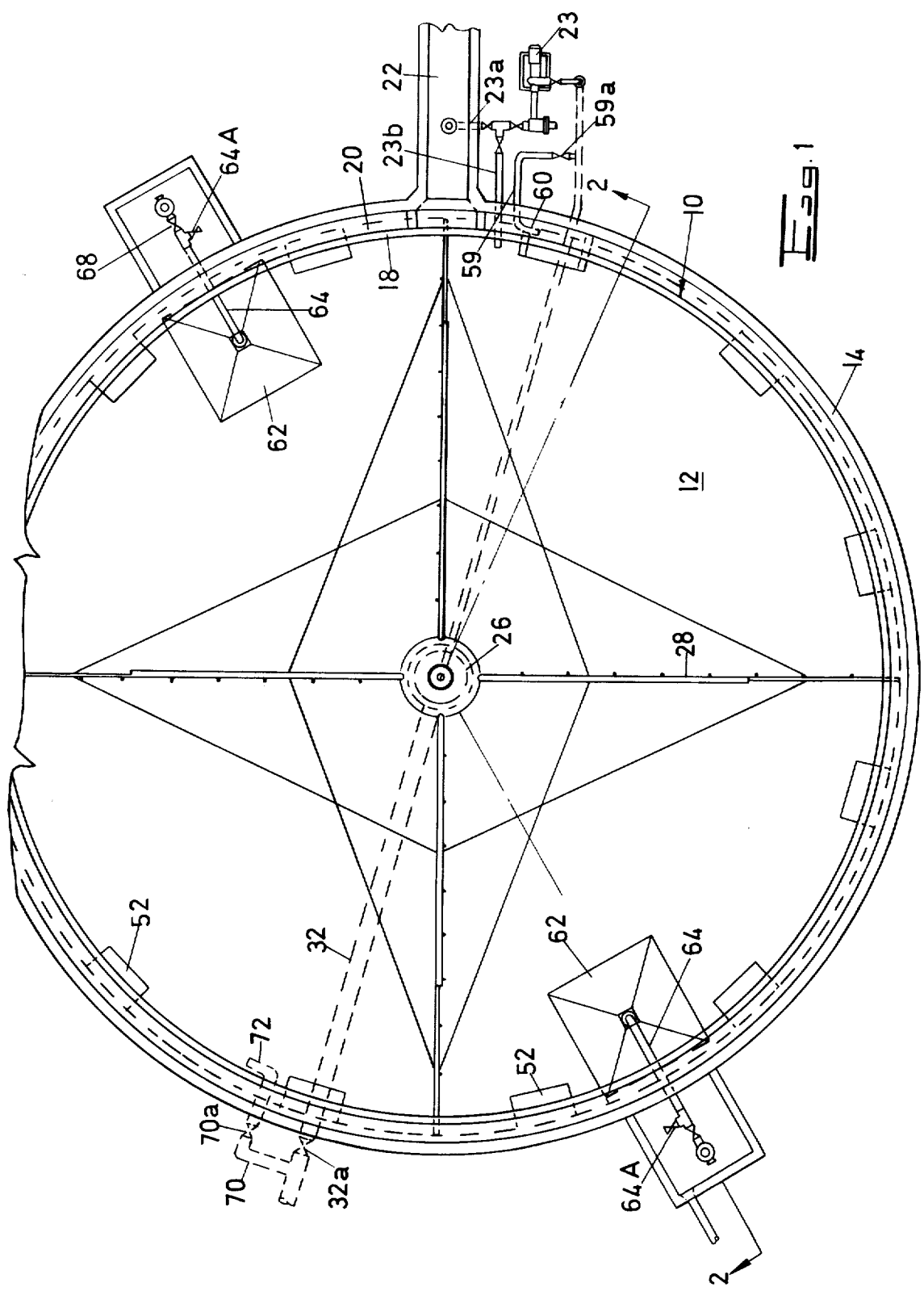

United States Patent [19]

Moore

[11] 4,049,549
[45] Sept. 20, 1977

[54] LIQUID CONDITION AND SETTLING TANKS

[76] Inventor: Richard Pierpoint Moore, Palonyra, Blackreef Road, Germiston, Transvaal, South Africa

[21] Appl. No.: 369,213

[22] Filed: June 12, 1973

Related U.S. Application Data

[63] Continuation of Ser. No. 117,017, Feb. 19, 1971, abandoned.

[51] Int. Cl.² ............................................. B01D 21/06
[52] U.S. Cl. ...................................... 210/104; 210/86; 210/112; 210/512 R; 210/523
[58] Field of Search .............. 210/304, 512, 519–521, 210/523, 112, 104, 86

[56] References Cited

U.S. PATENT DOCUMENTS

| | | | |
|---|---|---|---|
| 2,969,225 | 1/1961 | Jenks | 210/304 |
| 3,113,100 | 12/1963 | Moore | 210/520 |
| 3,220,706 | 11/1965 | Valdespino | 210/512 |
| 3,523,889 | 8/1970 | Eis | 210/112 |
| 3,534,861 | 10/1970 | Hubbell | 210/519 |

Primary Examiner—Thomas G. Wyse
Assistant Examiner—Robert H. Spitzer
Attorney, Agent, or Firm—Young & Thompson

[57] ABSTRACT

This invention relates to cylindrical liquid conditioning and settling tank having rotating conditioning arms. On the wall of the tank are narrow, inwardly directed parallel vanes that are inclined to the vertical and that serve to separate the tank into a lower water conditioning zone in which the water is turbulent and an upper water-solid separation zone in which the water is quiescent. At least one nozzle is provided to supply water into the tank below the vanes in a direction tangential to the tank wall.

7 Claims, 5 Drawing Figures

LIQUID CONDITION AND SETTLING TANKS

This is a continuation, of application Ser. No. 117,017, filed Feb. 19, 1971, now abandoned.

This invention relates to liquid conditioning and settling tanks.

Such tanks are known having an internal ring deflector at about a third of its height and having a means which urges the water radially outwards to impinge upon the wall of the tank and to be deflected backwards by the ring deflector towards the centre of the tank and thereafter upwards to a stilled settling zone thereabove. The ring deflector is an expensive item to provide and there is difficulty in providing it in steel tanks as opposed to concrete tanks. Also it has been necessary to provide vertical stilling vanes above the ring deflector to increase the tranquility of the settling zone. The provision of these stilling vanes adds to the cost of the tank.

According to the invention there is provided a liquid conditioning and settling tank comprising a cylindrical wall and a portion of the way up the wall, preferably in the middle third of the height of the wall, a series of space, vanes inclined to the axis of the tank.

Preferably there is further provided means for causing the liquid in the lower portion of the tank to move around the tank axis. Such means preferably comprises a jet producing means located below the vanes.

An embodiment of the invention will now be described by way of example with reference to the accompanying drawings.

Figure 2:
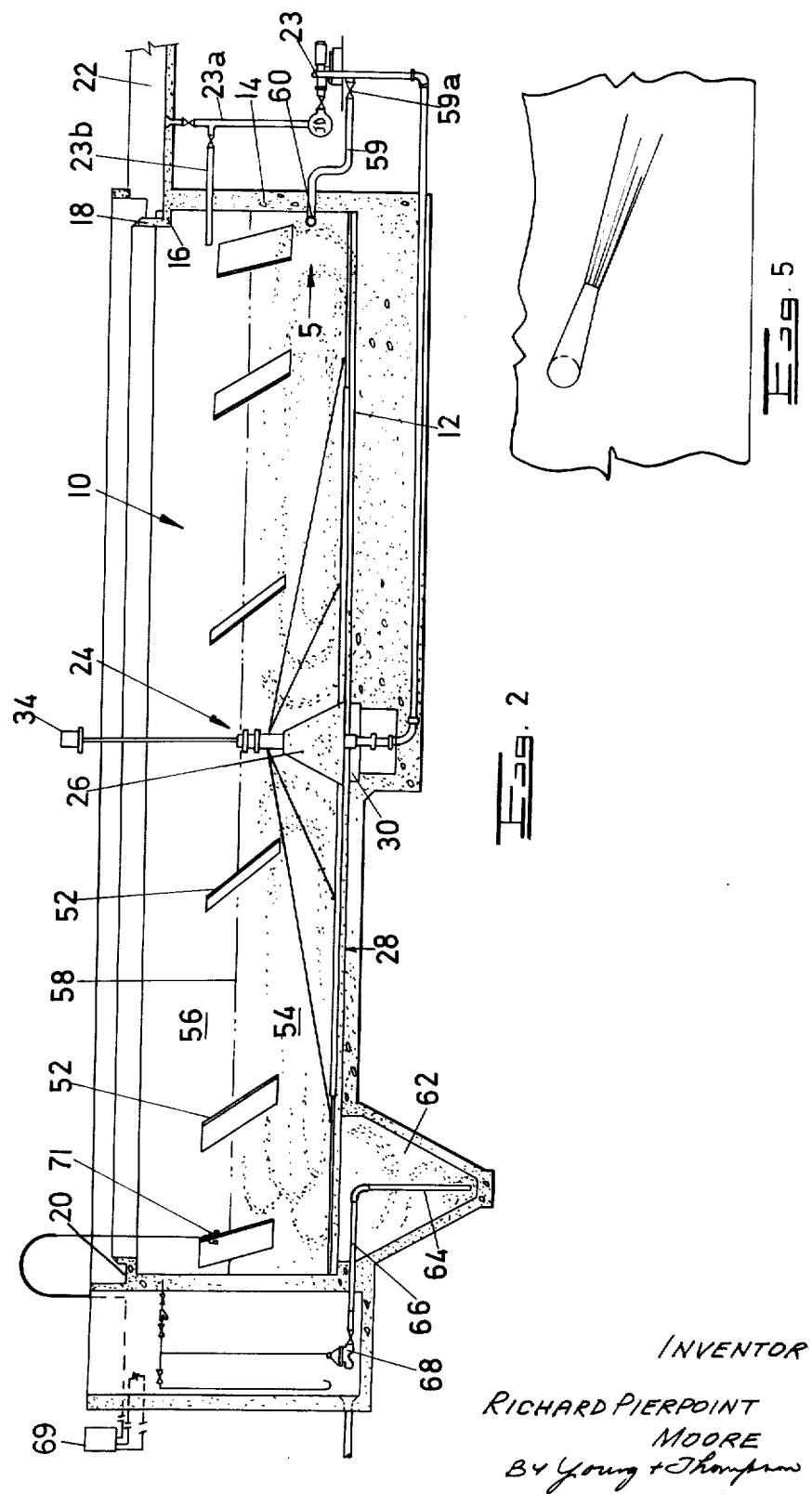
Figure 3:
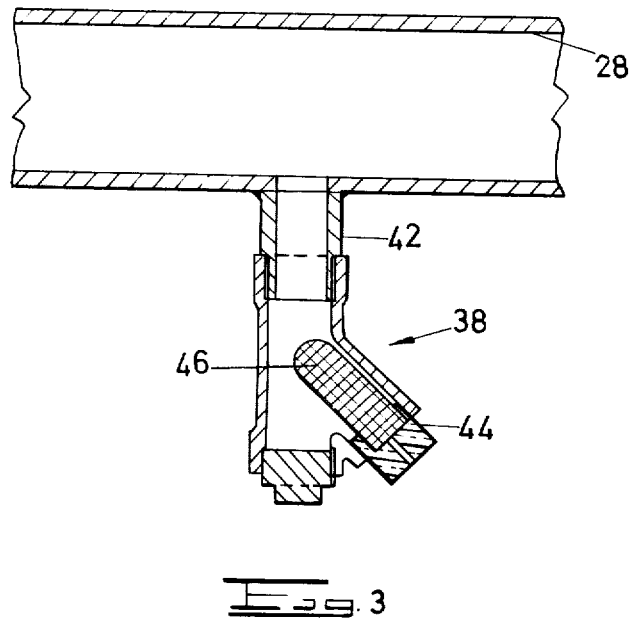
Figure 4:
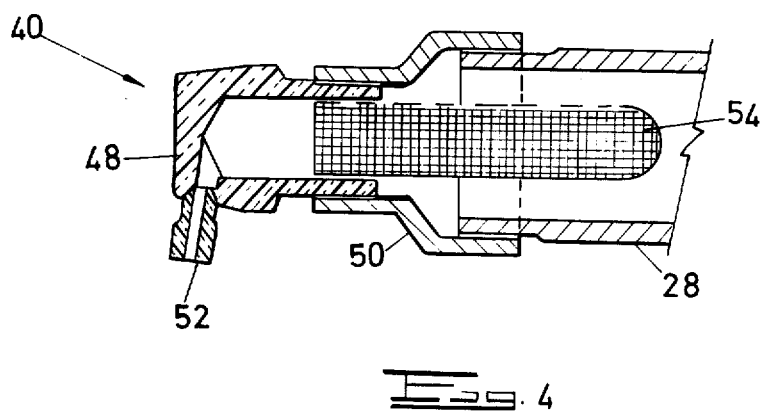

In the drawings:
FIG. 1 is a plan of a tank of the invention,
FIG. 2 is a section on line 2—2 of FIG. 1,
FIG. 3 is an enlarged detail section through a floor sweeping nozzle,
FIG. 4 is a similar section through a jet drive nozzle, and FIG. 5 is a detail view in the direction of arrow 5 in FIG. 2.

Referring now to the drawings, a settling tank 10 of the invention comprises a concrete cylindrical body having a flat base 12 and a cylindrical wall 14. The tank could equally be welded steel unit. An inwardly directed flange 16 is provided at the upper end of the wall 14 and this has a cylindrical lip 18 that forms a peripheral weir for the tank. Behind the weir 18 is an annular channel 20 leading to a discharge canal 22.

A centrifugal pump 23 is provided. The inlet to the pump 23 is connected by valve controlled pipes 23a and 23b to the canal 22 and the upper zone of the tank 10 respectively. Thus the pump can either recirculate treated liquid from the canal 22 or a clarified supernatant from the upper zone of the tank which will be quiescent as will be described.

A rotor 24 is centrally mounted in the tank 10 close to the base 12. The rotor 24 has a conical baffle 26 from which the arms 28 extend and under which a radial velocity controlled inlet 30 connected to the main inlet pipe 32 for raw, chemically treated water enters the tank 10. A rotation counter 34 is provided. The arms 28 of the rotor 24 are hollow and are fed with a small amount of liquid by the centrifugal pump 23. At their lower portions the arms 28 carry floor sweeping nozzles 38 (see FIG. 3). At the end of each arm 28 there is a jet drive nozzle 40 (see FIG. 4).

Each floor sweeping nozzle 38 comprises a vertical pipe 42 opening into the underside of the arm 28 and from which leads a nozzle part 44 which is inclined to the pipe 42. A filter 46 is provided in the nozzle part 44. The floor sweeping nozzles 38 are arranged so that they direct sludge traction jets of water downwardly and outwardly radial of the tank 10.

Each drive nozzle 40 comprises a reduced diameter portion 48 connected to the end of the arm by a union 50 and having an outlet portion 52 at nearly ninety degrees to the axis of the arm 28.

A filter 54 is provided in the union 50. The nozzle 40 is arranged so that it emits a horizontal jet of water substantially at right angles to the arm 28. The reaction from these horizontal jets serves to rotate the arms 28.

Around the inside surface of the wall 14 in about the middle third of the vertical height of the wall 14, there is provided a series of space, inclined vanes 52, formed by flat metal sheets and extending only about twelve inches into the tank. The vanes 22 are downwardly inclined for the reason that will be described below and serve to still the liquid in the tank so that there will be a turbulent lower conditioning zone 54 below the vanes 52 and a quiescent upper liquid-solid separation zone 56 above the vanes.

Below the vanes 52 there is a water inlet nozzle 60 fed through pipe 59 by the pump 23 with either treated liquid or clarified supernatant acquired as described above. The nozzle 60 discharges water tangentially to the wall 14, i.e. at right angles to a diameter of the wall at that point, and in the same direction as the arms 28 are caused to rotate. The nozzle 60 is slightly downwardly inclined (see FIG. 5) so that water discharged thereby has no vertical component of motion.

The inclination of the vanes 52 is such that when water rotataing as a result of action by the nozzle 60 impinges against them, the water will be reflected with no upward component.

In the base 12 at diametrically opposed locations adjacent the wall 14 are two pyramidal shaped sludge concentration sumps or hoppers 62. A desludge pipe 64 opens into each sump 62 near its lowermost portion. Each pipe 64 has a horizontal section 66 which contains a diaphram valve 68 controlled by a blanket level control device indicated at 69. This device 69 includes a pair of sensors 71 located midway up the height of the tank. These sensors 71 detect the blanket level 58 (which term is discussed in a following paragraph). When this level 58 rises above a pre-determined height it is detected by the sensors 71 and the control device 70 opens the valves 68.

The sludge in the slude sumps or hoppers 62 is now forced out of the tank through the de-sludge pipes 64 by hydrostatic head. It will be realised that if the hydrostatic head is not sufficient to remove the sludge, e.g. if the sludge deposition location is above the tanks 69, pumps may be provided also operated by the control device. When the blanket level 58 falls below the level of the sensor 71, the valves 68 will be closed. An overriding manually operable sludge discharge valve 64A is also provided.

The blanket level 58. I have found that there is a fairly sharp cut-off level between the clear water above and the turbid water below. This level is that which I call herein the blanket level. The height of this blanket level will vary with the amount of solids in the tank. When the accumulated sludge in the sludge sumps 62 has been removed as described above, the blanket level will fall.

A pipe 70 (see FIG. 1) is teed off the inlet pipe 32 and leads to a tangential inlet nozzle 72. This nozzle 72 is at substantially at the same height and inclined at the same direction as nozzle 60. Valves 74 and 76 control liquid flow through the pipes 32 and 70 so that if desired some or all of the inlet flow may enter the tank through the nozzle 72. Valves 32a, 59a, and 70a are provided in the pipes 32, 59 and 70 respectively. Thus, the inlet liquid may be introduced through the nozzle 72, or through the inlet 30, or part of this liquid may be introduced through the nozzle 72 and part through the inlet 30. Further, if desired, when inlet liquid is introduced through the nozzle 72, there may be no supply to the nozzle 60. Further, if desired, the nozzle 72 may be omitted entirely, or if is provided the nozzle 60 and/or the inlet 30 may be omitted.

In use, the raw chemically treated water will enter the tank 10 and being deflected by the baffle 26, moves radially outwards along the base 12. The movement of the water is reinforced by the jets from the floor sweeping nozzles 38. The reaction to the jets from the nozzles 40 causes the arms 28 to rotate. These latter jets are moving in a direction opposite to the jet from the nozzle 60 and this causes considerable local turbulence in the water. Further turbulence is caused by the confluence of the radially moving water streams along the base of the tank and the rotating streams of water at the inside surface of the wall 14. The vanes 52 also impart a flocculating and conditioning action to the water. Further the vanes 52 deflect and convert any rotary action of the water in the lower zone 54 of the tank 10 into flow towards the centre of the tank 10, as well as dampen movement of the water, other than the inward movement. Thus the water in the upper zone 56 will be substantially quiescent.

The jets from the floor sweeping nozzles 38 will sweep the solids, which have settled out on the base 12, outwardly and the swirling water at the inside surface of the wall 14 will convey these solids to the sumps 62.

In due course, the blanket level 58 will rise until it is detected by the sensors 71 so that the sumps will be desludged as mentioned above. If desired the manually operable sludge discharge valves 64A may be used as a control. The clear supernatant will pass over the weir 18 and will be taken off via the channel 22.

In a modified embodiment of the invention, the vanes 52 may be provided with a horizontal trailing portion from its lower trailing edge to provide additional damping of the water. Also the vanes may be angled slightly from the true diametral condition in order to cause rotating water to be deflected inwardly of the tank.

I have found that as the raw water moves along the base 12, the solids therein come into contact with the solids on the base 12 and tend to attach themselves together thereby improving the flocculation. Thus greater and heavier flocculated particles are formed which improves sedimentation. I have also found that a tank as described above is very economical to construct and in particular it is simple to mount the vanes especially to steel tanks where the costs of providing a ring deflector, as in previously known tanks, are very high by comparison. Further, I have found, the vanes provide as good, if not better, a stilling action as the ring deflector and no additional vertical stilling vanes are required.

The invention is not limited to the precise constructional details hereinbefore described and illustrated in the drawings. The spirit and scope of the invention is to be found in the claim alone.

Instead of using the floor-sweeping nozzles 38 any other suitable means may be provided to sweep the settled material on the floor of the tank to a withdrawal point. Similarly any suitable means other than the drive jet nozzles 40 may be provided to rotate the arms 28. Typical of such alternative rotating means is an electric motor which is conveniently mounted above the tank.

More than one nozzle 60 or 72 may be provided.

I claim:

1. A liquid conditioning and settling tank comprising a base, a cylindrical wall surrounding the base, a series of spaced vanes located about the cylindrical wall and projecting radially inwardly from the wall a portion of the way up the wall, means for feeding liquid to be treated into a lower portion of the tank, means to rotate the liquid circumferentially in the tank below the vanes in a predetermined direction, and velocity reducing take-off means for removing from the tank treated liquid at the upper surface of the liquid, the vanes being inclined from the vertical in the direction of rotation of the liquid and having exposed lower edges whereby the rotating liquid impinging on the vanes is deflected downward with substantially no upward component, said means to rotate the liquid comprising an inlet projecting through the wall below the inclined vanes and directed tangentially of the wall.

2. A tank as claimed in claim 1 in which the vanes are provided in the middle third of the height of the tank wall.

3. A tank as claimed in claim 1 in which the axis of the inlet is directed below the horizontal.

4. A tank as claimed in claim 1 in which the take-off means includes an outlet conduit by means of which the treated liquid is conveyed away from the tank, the inlet being connected to the outlet conduit to be supplied with liquid therefrom.

5. A tank as claimed in claim 1 in which the liquid feed means includes an inlet conduit by means of which liquid to be treated is conveyed to the tank, the inlet being connected to the inlet conduit to be supplied with liquid therefrom.

6. A tank as claimed in claim 1 comprising a pipe entering the tank above the vanes, the inlet being connected to the said pipe to be supplied with liquid from the tank through said pipe.

7. A tank as claimed in claim 1 further comprising sensing means located within the tank to detect the level of suspended solids in the liquid in the tank.

* * * * *